(No Model.)
E. F. NOYES.
TOOL HOLDER.
No. 334,042. Patented Jan. 12, 1886.
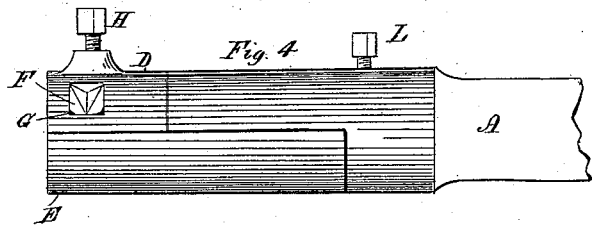
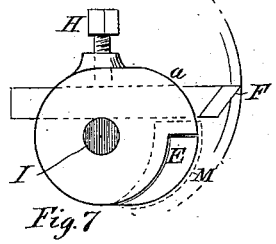
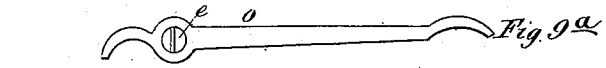
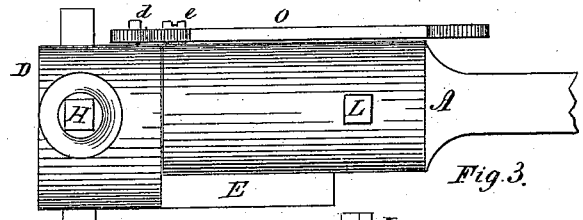
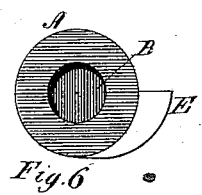
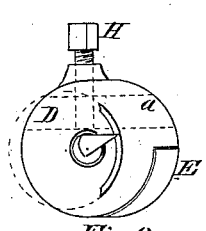
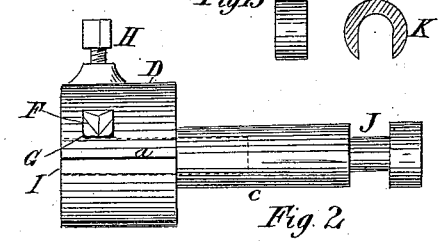
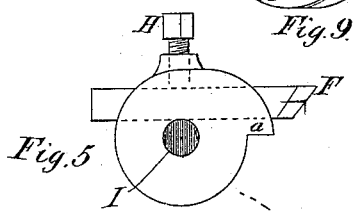
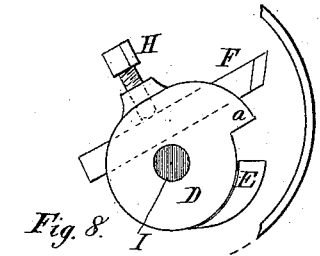
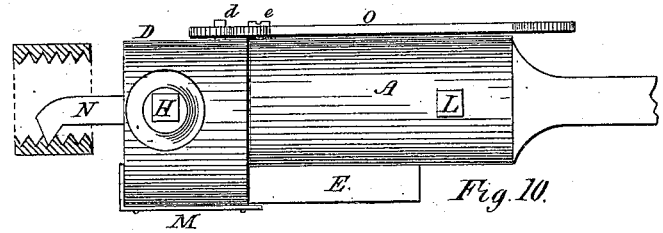
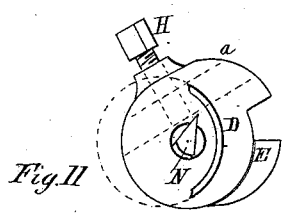
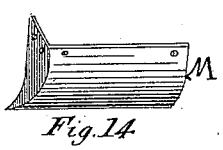
Witnesses
C. H. Freeman
D. A. Watson
Inventor
Edward Finch Noyes
By W. Bruce
Att'y
N. PETERS, Photo-Lithographer, Washington, D. C.

UNITED STATES PATENT OFFICE.

EDWARD FINCH NOYES, OF HAMILTON, ONTARIO, CANADA.

TOOL-HOLDER.

SPECIFICATION forming part of Letters Patent No. 334,042, dated January 12, 1886.

Application filed October 10, 1885. Serial No. 179,554. (No model.)

*To all whom it may concern:*

Be it known that I, EDWARD FINCH NOYES, of Hamilton, in the county of Wentworth, in the Province of Ontario, Dominion of Canada, have invented a certain new and useful Combination Tool-Holder for Cutting Inside Screw-Threads in a Lathe; and I do hereby declare that the following is a full, clear, and exact description of the construction and operation of the same.

My invention relates to a combination tool-holder by which inside screw-threads can be cut in a lathe on work from the smallest internal diameter to the largest. The only thing necessary to effect this is the change of tools in the holder and the position of same, as the work (large or small) to be done may require.

The object of my invention is to provide a tool-holder combining the capacity of doing all kinds of internal screw-cutting in a lathe on the smallest to the largest work, and to facilitate the process of cutting screws in a lathe by the application of relief mechanism to the tool-box of the holder, which enables the tool to be thrown out of cut by the lathe being reversed; or, if saddle is run back by hand, the tool may then be thrown out of cut by a lever on the tool-holder, which enables the tool to be withdrawn without any forward feed of slide-rest, as is necessary in using a fixed tool. This device also saves a large amount of steel, only short pieces being necessary, and consequently enables the very best steel to be used at much less cost than the ordinary steel used in fixed tools when same are forged from the bar. It also does away in a great measure with forging.

My invention consists in a metal bar having one end flattened to fit in the tool-post of a lathe, the other end cylindrical and provided with a circular opening in the center to receive the corresponding shank of a movable or lifting tool-box, which rests upon a projecting lug forged on the side of the said metal bar, the lug acting as a bed or stop for the movable tool-box when the tool is taking its cut. The said movable tool-box is provided with an opening running transversely across it for a square or round tool for cutting threads on a large internal diameter, and also an opening in the end for the admission of a bent pointed tool for cutting threads on small internal diameters. They are secured by a set-screw passing down from the top of the said box.

By reference to the drawings forming part of this specification, Figure 1 is a side view of a portion of the shank or bar. Fig. 2 is a side view of movable or relieving tool-box detached. Fig. 3 is a top view of both combined. Fig. 4 is a side view of the same. Fig. 5 is an end view of tool-box. Fig. 6 is a front end view of shank or bar. Fig. 7 is an end view of the tool-box and tool in the position for cutting a thread on a large internal diameter. Fig. 8 is an end view of the shank or bar and tool-box, showing the tool thrown back to be withdrawn. Fig. 9 is an end view of the bar, tool-box, and end tool in the position of cutting a thread on a small internal diameter. Fig. 9$^a$ is a detail view of the lever placed on the back of the cylindrical bar A for lifting the tool from the cut when the saddle of the lathe is run back without stopping the lathe. Fig. 10 is a top view of same. Fig. 11 is an end view of same, showing the tool thrown back to be withdrawn. Fig. 12 is a cross-section of open collar and fastening cup set-screw. Fig. 13 is a side view of collar. Fig. 14 represents the shield detached.

A is the shank or bar of steel having the right end square-shaped to fit in the tool-post of a lathe, and the left portion cylindrical and having a circular opening, B, in the center, and a projecting lug, E, forged solid to the cylindrical portion thereof, the use of which will be shown hereinafter. It is also provided with an opening on its top side for a set-screw.

D, Fig. 2, is the movable or relieving tool-box, provided at one end with a cylindrical shank, c, having near its outer end a groove, J, cut around it, in which is slipped a steel collar, K, the under portion of the collar being cut away to enable it to be put over the said groove. The projection c of the movable box D is inserted in the opening B of the shank A as far as it will go, and secured there by means of a cup set-screw, L, passing through the top of the shank and impinging on the collar K. Thus the box D is held to the shank A, but allowed to move or swing backward. The said box is also provided with a lug, $a$, which, when the device is in position for cutting, rests or beds upon the corresponding lug, E, on the lower side of the bar A.

F is a straight cutting-tool of square or round steel for large or heavy work, set into an opening, G, transversely across the tool-box D, and secured by a set-screw, H.

I is an opening in the end of the movable tool-box D, to receive a round or square bent pointed tool, N, for cutting threads on small internal diameters, and secured by the same set-screw, H, which also fastens the tool F when in operation. Of course it will be seen that the said set-screw fastens only one tool at a time, the one being withdrawn when the other is to be used.

O is a lever placed at the back of the cylindrical part of the bar A, secured by a screw, $e$, the front part of the lever being bent and pressing on a projecting pin, $d$, inserted in the movable box D. This device is for lifting the tool from the cut when the saddle of the lathe is run back by hand without the lathe being stopped.

It may here be observed that when this tool-holder is used in a lathe that is reversed when screw-cutting, this lever O can be detached from the tool-holder, as in this case the lathe lifts the tool by the thread being cut turning the reverse way, the lever only being necessary to free the tool from the cut when the lathe is not reversed or stopped and the tool-box is too far in the work to be easily reached; and it will be seen that this said lever also only applies to the tool for large work, as the tool for cutting the smaller inside threads can be easily thrown back by hand, the tool-box in this case not entering the work.

M is a shield of sheet-brass or other suitable metal riveted to the side and end of the tool-box D, for the purpose of excluding chips and dirt during the operation of the work. The set-screw L being screwed down on the collar tightly and into the collar, and then being eased slightly, allows the shank $c$ to move easily without the collar K moving at all, thus making a secure device for holding the movable tool-box in the cylinder of the bar A.

The method of operating the device is as follows: When a screw-thread is desired to be cut in any small internal diameter, the bent tool N is inserted in the opening I at the end of the tool-box D and secured in place by its set-screw. When this is done, the tool-holder is placed in the tool-post of lathe, and the operation of cutting the inside thread proceeded with, the same as if a fixed tool were used, the difference between a fixed tool and my device being that when the tool has finished its first cut the slide-rest has to be fed in (when fixed tool is used) to free the tool from the cut, whereas with my device all that is required is to throw the tool-box back if the saddle is run back by hand, which frees the tool from the cut and allows the same to come out without touching the thread. When lathes are used that are operated by cross-belt, it is not necessary to touch the tool, as the thread, by turning the reverse way, lifts the point of tool itself without the operator having to touch same.

When a screw-thread is desired to be cut in a large internal diameter, the bent tool is taken out and the straight tool put in the opening running transversely across the tool-box and secured in place by its set-screw. The work of cutting the screw is then started as with a fixed tool, the difference being that when the tool has finished its cut, instead of the slide-rest having to be fed in to free the tool from the cut, the movable tool-box does it, thus leaving the slide-rest stationary, and enabling the operator to take an equal amount of cut each time, which is a much more difficult thing to accomplish when the slide-rest has to be worked both ways.

This device, when very close fitting is required, will save much trouble, as there is no danger of getting in too far with the tool-point. When the saddle of the lathe is run back by hand, the lever at the side of the tool-holder lifts the tool from the cut, and this enables the operator to withdraw the same without touching the thread being cut. This lever is provided as an easy means for elevating tool, as it is more handy for an operator, more particularly when the thread to be cut is some distance in, in which case if the lever were not attached the process of elevating the tool-box would not be as quick or easy. The tool, by the aid of the lever, can be raised instantly, as there is no resistance on the tool as soon as it enters the groove cut in the work for the tool to finish in. It will be further observed that the construction of this device is very substantial, being made of steel throughout, and thus making a very rigid tool for the larger kinds of work—an advantage which cannot be gained by a fixed tool without a large expenditure of steel. It also makes a rigid tool for smaller work, as the tool itself need only project from the end of the tool-box, in which it is inserted a very short distance more than the depth of the screw-thread it is desired to cut. Of course when a thread in a large internal diameter is desired to be cut right up to the end of the opening, it will be required to bend the tool so that the point of the same will project beyond the end of the box D.

What I claim as my invention, and desire to secure by Letters Patent, is—

1. In a tool-holder for holding tools for cutting internal screw-threads, the combination of the bar A and a movable tool-box, D, attached therein, and provided with openings for cutting-tools to be inserted therein, substantially as and for the purpose specified.

2. In a tool-holder, the combination of the bar A, movable box D, and tool F, for cutting screw-threads on large internal diameters, substantially as specified.

3. In a tool-holder, the bar A, having the lug E attached thereto, in combination with the movable box D, having the projection $a$, substantially as described.

4. In a tool-holder, the combination of the movable box D, bar A, lever O, and pin $e$, substantially as and for the purpose specified.

5. The combination, with the movable box D, provided with the groove J, of the collar K and cup set-screw L, for securing the box to the bar A, as specified.

Dated at Hamilton, Canada, this 28th day of September, 1885.

EDWARD FINCH NOYES.

In presence of—
  A. F. TREMANE,
  WM. BRUCE.